(12) United States Patent
Derome et al.

(10) Patent No.: US 11,991,241 B2
(45) Date of Patent: *May 21, 2024

(54) SERVER SYSTEM AND METHOD OF MANAGING SERVER SYSTEM

(71) Applicant: Supercell Oy, Helsinki (FI)

(72) Inventors: John Nicholas Derome, Helsinki (FI); Robert Kamphuis, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,440

(22) Filed: Jan. 17, 2023

(65) Prior Publication Data

US 2023/0231902 A1 Jul. 20, 2023

Related U.S. Application Data

(63) Continuation of application No. 17/732,796, filed on Apr. 29, 2022, now Pat. No. 11,582,295, which is a continuation of application No. 16/842,211, filed on Apr. 7, 2020, now Pat. No. 11,323,507.

(51) Int. Cl.
| | | |
|---|---|---|
| *G06F 11/00* | (2006.01) | |
| *G06F 11/20* | (2006.01) | |
| *H04L 41/0668* | (2022.01) | |
| *H04L 67/1004* | (2022.01) | |
| *H04L 9/40* | (2022.01) | |

(52) U.S. Cl.
CPC ...... *H04L 67/1004* (2013.01); *H04L 41/0668* (2013.01); *H04L 63/104* (2013.01)

(58) Field of Classification Search
CPC ............. H04L 67/1004; H04L 41/0668; H04L 63/104; G06F 11/1662; G06F 11/2025; G06F 11/2028; G06F 11/2041; G06F 11/2048; G06F 11/3055; G06F 11/3006
See application file for complete search history.

(56) References Cited

U.S. PATENT DOCUMENTS

| | | | | |
|---|---|---|---|---|
| 9,973,431 | B2 * | 5/2018 | Mishra | H04L 47/12 |
| 11,323,507 | B2 * | 5/2022 | Derome | G06F 11/2041 |
| 11,403,036 | B2 * | 8/2022 | Kamran | G06F 11/1423 |
| 11,582,295 | B2 * | 2/2023 | Derome | G06F 11/2041 |
| 2017/0169087 | A1 * | 6/2017 | Kapadia | G06F 11/2097 |
| 2020/0044950 | A1 * | 2/2020 | Shih | G06F 11/3006 |
| 2020/0404047 | A1 * | 12/2020 | Kurhe | H04L 67/1004 |

* cited by examiner

*Primary Examiner* — Schquita D Goodwin
(74) *Attorney, Agent, or Firm* — Ziegler IP Law Group

(57) ABSTRACT

A server system including a first server to execute first role, other server to execute at other role, spare server and management layer server. The management layer server is configured to allocate first group of users to access first server and other group of users to access other server, receive status information sent by first server and status information sent by other server, analyse status information to determine an operational status of first server and operational status of other server, update role of spare server to first role when operational status of first server indicates failed state and reallocate first group of users to the spare server, and update a role of another spare server to the other role when the operational status of the other server indicates a failed state and reallocate the other group of users to the other spare server.

20 Claims, 7 Drawing Sheets

SERVER SYSTEM AND METHOD OF MANAGING SERVER SYSTEM

TECHNICAL FIELD

The present disclosure relates generally to a server system having multiple servers in communication with user devices over a data network to execute application(s) thereon; and more specifically, to a server system configured to manage traffic and balance load on each of the servers therein.

BACKGROUND

Computing systems that include multiple user devices connected over a data network are typically provided with a number of servers that interact to accomplish designated task/s of the individual computing system. Each server within such computing system is typically provided with a number of resources that it utilizes to carry out its function. In operation, one or more of these resources may become a bottleneck as load on the computing system increases, ultimately resulting in degradation of connection quality, server crashes and/or system failures.

Conventionally, the mentioned problem has been often solved by increasing more resources at the problem. For example, when performance degradation is encountered, more memory, a faster CPU (central processing unit), multiple CPUs, or more disk drives are added to the server in an attempt to prevent overloading or crashing of systems. Such solutions are typically expensive, processing intensive and time consuming. Furthermore, several other solutions include use of technologies such as DSL and cable modems for high speed switching and routing. However, even such technologies are generally unable to provide quality service to the users and mitigate possibilities of server crash, thereby leading to an unpleasant experience for the user.

As an additional problem is a situation in which a large number of users are accessing same software, such as a particular game. In case of failure in the server system there is a risk that all users are negatively impacted by the service break.

Therefore, in the light of the forgoing discussion, there exists a need to overcome the aforementioned limitations associated with the conventional computing systems for managing resources and traffic.

SUMMARY

The present disclosure seeks to provide a server system. The present disclosure also seeks to provide a method for managing a server system. The present disclosure seeks to provide a solution to the existing problem of load unbalancing and unreliability on a system when used by multiple users. An aim of the present disclosure is to provide a solution that overcomes at least partially the problems encountered in prior art, and provides a deterministic management of servers in a network. Further, the present disclosure enhances reliability of the server system, in case of high load demands, and eliminates indeterminate performance issues such as crashing of systems due to heavy loads, reduces latencies and capacity problems.

In a first aspect, an embodiment of the present disclosure provides a server system comprising:
a first server configured to execute a first role;
at least one other server configured to execute at least one other role;
at least one spare server; and
a management layer server, wherein the management layer server is configured to:
allocate a first group of users to access the first server and at least one other group of users to access the at least one other server;
receive status information sent by the first server and status information sent by the at least one other server;
analyse the status information to determine an operational status of the first server and an operational status of the at least one other server;
update a role of a first one of the at least one spare server to the first role when the operational status of the first server indicates a failed state and reallocating the first group of users to the first one of the at least one spare server; and
update a role of another one of the at least one spare server to the at least one other role when the operational status of the at least one other server indicates a failed state and reallocating the at least one other group of users to the at least one other spare server.

In a second aspect, an embodiment of the present disclosure provides a method for managing a server system the method comprising:
executing a first role in a first server;
executing at least one other role in at least one other server;
allocating a first group of users to access the first server and at least one other group of users to access the at least one other server;
receiving status information from the first server and status information from the at least one other server;
determining, an operational status of the first server and an operational status of the at least one other server, by analysing the status information;
updating a role of a first one of at least one spare server to the first role when the operational status of the first server indicates a failed state and reallocating the first group of users to the first one of the at least one spare server; and
updating a role of another one of the at least one spare server to the at least one other role when the operational status of the at least one other server indicates a failed state and reallocating the at least one other group of users to the at least one other spare server In a third aspect, an embodiment of the present disclosure provides a method of managing a server system comprising a first server for executing a first software according to a first role, at least one other server for executing at least one other software according to a second role, at least one spare server having a third role, and a management layer server, the method comprising:
providing a list of roles to the management layer server;
allocating a first group of users to access the executable first software running in the first server and a second group of users to access the executable at least one other software running in the at least one other server;
sending a status information, by the first server and the at least one other server, to the management layer server;
receiving the status information and analysing the received status information, by the management layer server, to determine a first operational status of the first server and a second operational status of the at least one other server;
advertising, by the management layer server, the first role as a free role, if the first operational status indicates a failure in the first server or advertising the second role as a free role, if the second operation status indicates a failure in the at least one other server;

updating the third role of the at least one spare server as the advertised free role;

executing a third software according to the updated third role in the at least one spare server; and re-allocating the group of users which were allocated to the failed server to access the third executable software running the at least one spare server.

Embodiments of the present disclosure substantially eliminate or at least partially address the aforementioned problems in the prior art, and provides a reliable, fast and robust serve system that mitigates possibilities of latency and server crashing, thereby providing a seamless and uninterrupted experience to users.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
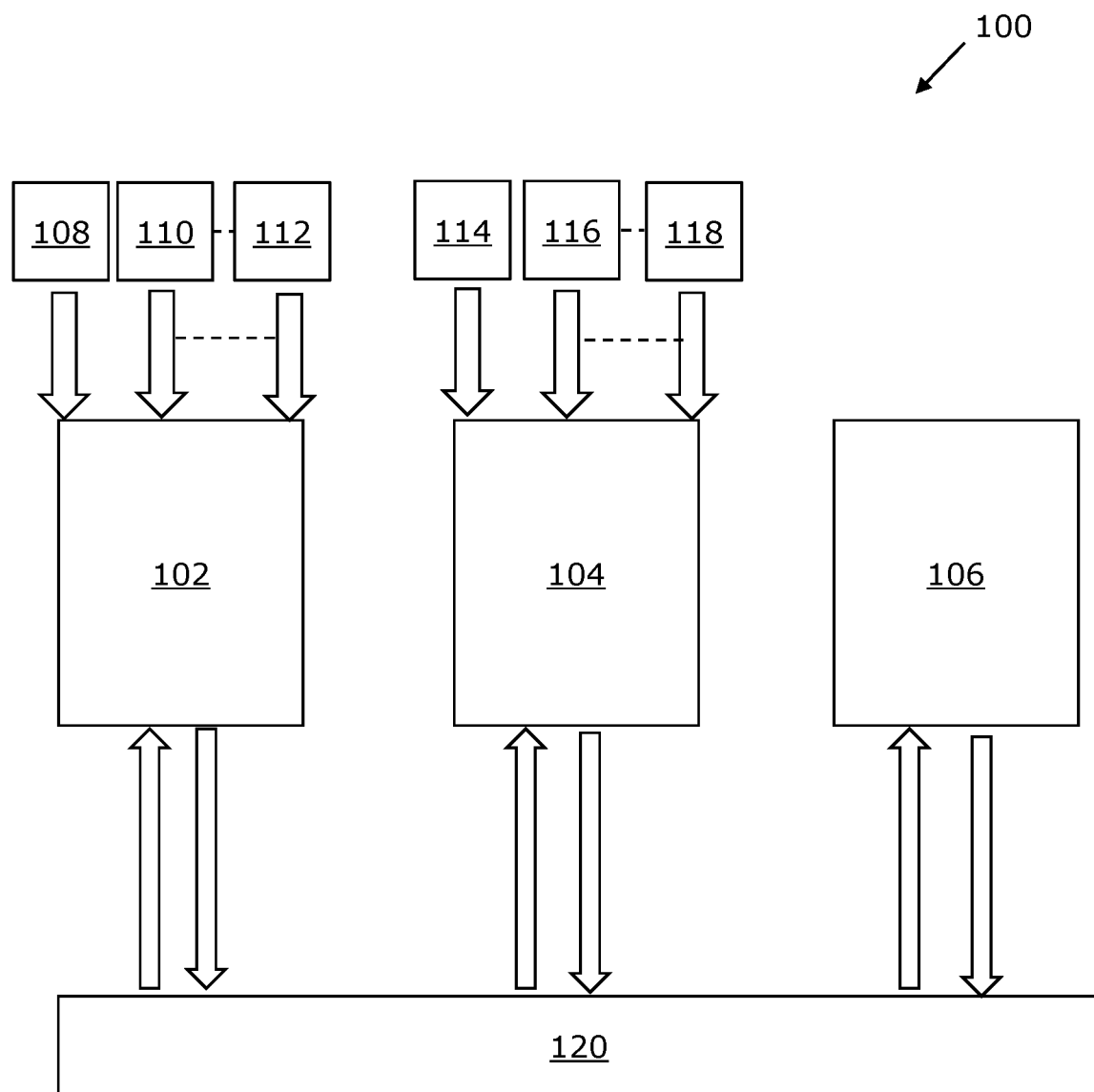
FIG. 1 is a block diagram of an exemplary server system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a server system comprising:

a first server configured to execute a first role;

at least one other server configured to execute at least one other role;

at least one spare server; and a management layer server, wherein the management layer server is configured to:

allocate a first group of users to access the first server and at least one other group of users to access the at least one other server;

receive status information sent by the first server and status information sent by the at least one other server;

analyse the status information to determine an operational status of the first server and an operational status of the at least one other server;

update a role of a first one of the at least one spare server to the first role when the operational status of the first server indicates a failed state and reallocating the first group of users to the first one of the at least one spare server; and update a role of another one of the at least one spare server to the at least one other role when the operational status of the at least one other server indicates a failed state and reallocating the at least one other group of users to the at least one other spare server.

In a second aspect, an embodiment of the present disclosure provides a method for managing a server system the method comprising:

executing a first role in a first server;

executing at least one other role in at least one other server;

allocating a first group of users to access the first server and at least one other group of users to access the at least one other server;

receiving status information from the first server and status information from the at least one other server;

determining, an operational status of the first server and an operational status of the at least one other server, by analysing the status information;

updating a role of a first one of at least one spare server to the first role when the operational status of the first server indicates a failed state and reallocating the first group of users to the first one of the at least one spare server; and updating a role of another one of the at least one spare server to the at least one other role when the operational status of the at least one other server indicates a failed state and reallocating the at least one other group of users to the at least one other spare server In a third aspect, an embodiment of the present disclosure provides a method of managing a server system comprising a first server for executing a first software according to a first role, at least one other server for executing at least one other software according to a second role, at least one spare server having a third role, and a management layer server, the method comprising:

providing a list of roles to the management layer server;

allocating a first group of users to access the executable first software running in the first server and a second group of users to access the executable at least one other software running in the at least one other server;

sending a status information, by the first server and the at least one other server, to the management layer server;

receiving the status information and analysing the received status information, by the management layer server, to determine a first operational status of the first server and a second operational status of the at least one other server;

advertising, by the management layer server, the first role as a free role, if the first operational status indicates a failure in the first server or advertising the second role as a free role, if the second operation status indicates a failure in the at least one other server;

updating the third role of the at least one spare server as the advertised free role;

executing a third software according to the updated third role in the at least one spare server; and re-allocating the group of users which were allocated to the failed server to access the third executable software running the at least one spare server.

The present disclosure provides a server system for management of servers in a network involving, for example re-routing of traffic from one server to another, in case of failures. The present server system may be employed for a varied range of applications, including online gaming applications that require higher processing speeds, higher reliability and higher robustness. Other tasks and applications that may incorporate principles of the present invention include, but are not limited to, database management systems, application service providers, corporate data centers, modelling and simulation systems, graphics rendering systems, complex computational analysis systems, etc. Although the principles of the present invention may be described with respect to a specific application, it will be recognized that many other tasks or applications may be performed utilizing the present server system without any limitations.

Among the many advantages provided by the present server systems and methods are increased performance of designated roles across a wide range of loads. Furthermore, the present server system enhances reliability of the server, even in case of high load demands. The present disclosure aims at reducing indeterminate performance characteristics such as crashing of computing systems due to heavy loads, that are common with conventional system. The present server system is also employed for eliminating latencies, load capacity problems, and so forth. The present server system also aims at efficient utilization of hardware resources for a better performance. In particular, the server system when employed for gaming applications allows users from different geographical locations to experience an uninterrupted, fast and continuous service and performance.

For the purpose of the present disclosure, there will now be considered an exemplary network environment, wherein the server system comprising a first server, at least one other server, at least one spare server and a management layer server are connected to one another via a communication network. Throughout the present disclosure, the term "communication network" relates to an arrangement of interconnected programmable and/or non-programmable components that are configured to facilitate data communication between one or more electronic devices and/or databases, whether available or known at the time of filing or as later developed. Furthermore, the communication network may include, but is not limited to, one or more peer-to-peer network, a hybrid peer-to-peer network or the like. Herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

It will be appreciated that the network environment may be implemented in various ways, depending on various possible scenarios. In one example scenario, the network environment may be implemented by way of a spatially collocated arrangement of components of the server system such as the first server, the at least one other server, the at least one spare server and the management layer server. In another example scenario, the network environment may be implemented by way of a spatially distributed arrangement of the first server, the at least one other server, the at least one spare server and the management layer server coupled mutually in communication via the communication network. In yet another example scenario, the first server, the at least one other server, the at least one spare server and the management layer server may be implemented via a cloud server.

Throughout the present disclosure, the term "server" as used in "first server", "at least one other server", "at least one spare server", and "management layer server" refers to an arrangement of at least one server configured to improve cyber security in the organization. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client. Herein, the client may be a plurality of user devices associated with a first group of users and at least one other group of users that are communicatively coupled to the server arrangement via the communication network. Examples of the user devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, and desktop computers.

The present server system can be deployed to third parties, for example an organization, as part of a service wherein a third party virtual private network (VPN) service is offered as a secure deployment vehicle or wherein a VPN is built on-demand as required for a specific deployment. A VPN is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid. In other examples, the present solution as a service can also be deployed and integrated into the IT infrastructure of the organisation.

In particular, the first server is configured to execute a first role, and the at least one other server is configured to execute at least one other role. Throughout the present disclosure, the term "role" as used in "first role" and "at least one other role" refers to functions that are performed by the server to execute a software application, such as a gaming application. It will be appreciated that a gaming application may comprise a number of functionalities and/or processes that are need to be processed and executed in a synchronous manner to achieve the outcome of the gaming application as provided to end-users, such as first group of users and the other group of users. The roles may be dedicated tasks or sub-tasks associated with executing the gaming application or any other application, performed by each of the first server and the at least one other server. Examples of different roles include, but are not limited to, network interfacing, storage processing, graphics processing, command processing, application processing, system management processing, protocol processing, delivery of static content such as web pages, MP3 files, HTTP object files, audio stream files, video stream files, etc., and delivery of dynamic content such as instructions and commands that require iterative processing. In an example, the server system may comprise a plurality of servers, including the first server and the at least one other server. Herein, each of the plurality of servers are configured to perform different roles as required by the server system.

Optionally, the first server runs a first executable software according to the first role and the at least one other server runs at least one other executable software according to the at least one other role. Throughout the present disclosure, the term "executable software" as used in "first executable software" and "at least one other executable software" refers to a collection or set of instructions executable by the first server and/or the at least one other server so as to configure the first server and/or the at least one other server to perform a task such as the first role and the at least one other role. Additionally, the executable software may be stored in a storage medium such as RAM, a hard disk, optical disk, or so forth, and is also intended to encompass so-called "firmware" that is software stored on a ROM or so forth. Optionally, the term "executable software" refers to a software application. Such executable software is organized in various ways, for example the executable software includes components organized as libraries, Internet-based programs stored on a remote server or so forth, source code, interpretive code, object code, directly executable code, and so forth. It may be appreciated that the software may invoke system-level code or calls to other software residing on a server or other location to perform certain functions. Furthermore, the executable software may be pre-configured and pre-integrated with an operating system, building a software appliance. In an example, the executable software can be an online game software. Optionally, the first executable software and the at least one other executable software are the same. In such a case, the same software is executed in the first server and the at least one other server, such that the first server and the at least one other server perform the same role. Optionally, the first executable software and the at least one other executable software are different. In such a case, different software is executed in the first server and the at least one other server, such that the first server and the at least one other server perform different roles. Hereinafter, for the sake of simplicity and clarity, the "first server" and the "at least one other server" are sometimes interchangeably referred to as the "main server".

Notably, the at least one spare server is configured to takeover any of the main servers that have undergone a failure or a breakdown. In particular, the at least one spare server is configured to provide sufficient bandwidth to allow for re-routing of traffic from any of the main servers thereto, in case of failure of the main servers. It will be appreciated that the at least one spare server is configured to run an executable software, same as the executable software in any of the failed main servers, thereby providing an uninterrupted access of servers to the plurality of users.

Optionally, the first server, the at least one other server, and at least one spare server are distributively interconnected across the communication network to create a virtual distributed interconnected backplane between individual components such as servers, routers, switches, management layers across the network that may, for example, be configured to operate together in a deterministic manner as described herein. In an example, the server system may be employed in combination with technologies such as wavelength division multiplexing ("WDM") or dense wavelength division multiplexing ("DWDM") and optical interconnect technology (e.g., in conjunction with optic/optic interface-based systems), INFINIBAND, LIGHTNING I/O or other technologies. Advantageously the present configuration may be used, for example, to allow separate servers to be physically remote from each other and/or to be operated by two or more entities (e.g., two or more different service providers) that are different or external in relation to each other. In the present examples, one or more processing functionalities may be located physically remote from one or more other processing functionalities (e.g., located in separate chassis, located in separate buildings, located in separate cities/countries, etc.). In an alternate embodiment however, several components may be located in a common local facility if so desired.

Further, the management layer server is configured to manage traffic of one or more main servers and also to re-route traffic to the at least one spare servers in case of failure of the one or more main servers, by accessing information related to operational status of the first server and the at least one other server. It will be appreciated that the management layer server is configured to optimize bandwidth utilization and allow density determination for traffic management in order to enhance reliability of the system. Notably, the management layer server is communicatively coupled with each of the first server, the at least one other server and the at least one spare server, in order to continuously monitor the operational status of each of the main servers to determine if any of the main servers are overloaded or are under a state of breakdown, and to allow for re-routing of traffic to the at least one spare servers in case of failure of the one or more main servers.

In particular, the management layer server is configured to allocate a first group of users to access the first server and at least one other group of users to access the at least one other server. Notably, different set of users are associated with different main servers, such that each of the group of users are allocated to execute different roles. In an example, the first group of users is allocated to the first server configured to execute a first role, a second group of users is allocated to a second server configured to execute a second role, a third group of users is allocated to a third server configured to execute a third role, and so forth, depending on the number of main servers and associated roles in the system. Optionally, the group of users may be allocated dynamically to the main servers, or the group of users may be allocated based on the main server, such as a common criteria or characteristic. In an example, the first group of users may belong to one geographical location and the other group of users may belong to other geographical location; and herein, the first group of users is allocated to the first server, and the other group of users is allocated to the other server, based on the geographical location of each of the users.

Further, the management layer server is configured to receive status information sent by the first server and status information sent by the at least one other server. It will be appreciated that the status information relates to a current operational status of each of the main servers. The status information of each of the main servers is continuously monitored by the management layer server. In an example, the first server and the at least one other server are configured to constantly transmit the status information to the management layer server in regular or irregular intervals of time. Examples of such status information may include signals or messages such as "ACTIVE", "INACTIVE", "SYSTEM FAILURE", "SYSTEM OVERLOADED" and so forth, which may be transmitted to the management layer server indicating operational status of each of the main servers. In another example, status information is received from each of the main servers by polling. In particular, polling is performed by checking the status by ping and reading the response, as received from the main servers.

Further, the management layer server is configured to analyse the status information to determine an operational status of the first server and an operational status of the at least one other server. For examples, the operational status of the first server and the at least one other server may be analysed to be "ACTIVE", "INACTIVE", "SYSTEM FAILURE", "SYSTEM OVERLOADED" and so forth, based on the received status information from each of the main servers. It will be appreciated that the management layer server can be configured to determine various operational states as required. However, hereinafter, for the sake of simplicity and clarity, there will be considered two operational states namely; an active state (when the main server is up and running) and a failed state (when the main server is non-responsive and/or is crashed). Optionally, the operational status can also be determined by determining a time difference between a moment of time of analysis and a moment of time of receiving the status information. In an example, wherein the operational status indicates a failed state, if the time difference between the moment time of analysis of the status information and the moment time of receiving the status information is larger than predetermined time difference. It is to be understood that such a server system prevents latency in the system, which may otherwise have occurred due to delay in response from the main servers and/or a delay in analysis of the status information.

Optionally, several other parameters can also be monitored to analyse the operational status of the main servers that include, but are not limited to, processing engine bandwidth, Fibre Channel bandwidth, number of available drives, IOPS (input/output operations per second) per drive and RAID (redundant array of inexpensive discs) levels of storage devices, memory available for caching blocks of data, table lookup engine bandwidth, availability of RAM for connection control structures and outbound network bandwidth availability, shared resources (such as RAM) used by streaming application on a per-stream basis as well as for use with connection control structures and buffers, bandwidth available for message passing between subsystems, bandwidth available for passing data between the various servers, etc.

Optionally, the management layer comprises several layers that serve as a monitoring engine for the management layer server. For example, the management layer server may comprise a state acquisition layer for acquiring status information of each of the main servers, a role management layer for assigning different roles to different main servers and spare servers and maintaining a structured list for the same, and a resource management layer for balancing load and re-routing traffic from main servers to spare servers in case of failures.

Optionally, the server system further comprises a database arrangement for storing roles of each of the main servers and the spare server. Also, the database arrangement is configured to store an operational status of each of the main servers and the spare server. Notably, such information is constantly updated in real-time or near real-time. Throughout the present disclosure, the term "database arrangement" as used herein refers to arrangement of at least one database that when employed, allows for the management layer server to store roles of each of the servers, operational status of each of the servers and the like. The term "database arrangement" generally refers to hardware, software, firmware, or a combination of these for storing information in an organized (namely, structured) manner, thereby, allowing for easy storage, access (namely, retrieval), updating and analysis of such information. The term "database arrangement" also encompasses database servers that provide the aforesaid database services to the server system. It will be appreciated that the data repository is implemented by way of the database arrangement.

The computer system may include a processor and a memory. The processor may be one or more known processing devices, such as microprocessors manufactured by Intel™ or AMD™ or licensed by ARM. Processor may constitute a single core or multiple core processors that executes parallel processes simultaneously. For example, processor may be a single core processor configured with virtual processing technologies. In certain embodiments, processor may use logical processors to simultaneously execute and control multiple processes. Processor may implement virtual machine technologies, or other known technologies to provide the ability to execute, control, run, manipulate, and store multiple software processes, applications, programs, etc. In another embodiment, processor may include a multi-core processor arrangement (e.g., dual, quad core, etc.) configured to provide parallel processing functionalities to allow computer system to execute multiple processes simultaneously. One of ordinary skill in the art would understand that other types of processor arrangements could be implemented that provide for the capabilities disclosed herein. Further, the memory may include a volatile or non-volatile, magnetic, semiconductor, solid-state, tape, optical, removable, non-removable, or other type of storage device or tangible (i.e., non-transitory) computer-readable medium that stores one or more program(s), such as app(s).

Program(s) may include operating systems (not shown) that perform known operating system functions when executed by one or more processors. By way of example, the operating systems may include Microsoft Windows™, Unix™, Linux™, Android™ and Apple™ operating systems, Personal Digital Assistant (PDA) type operating systems, such as Microsoft CE™, or other types of operating systems. Accordingly, disclosed embodiments may operate and function with computer systems running any type of operating system. The computer system may also include communication software that, when executed by a processor, provides communications with network and/or local network, such as Web browser software, tablet, or smart hand held device networking software, etc.

According to an embodiment, the management layer server is further configured to advertise the first role as a first free role if the operational status of the first server indicates a failed state of the first server and advertise the at least one other role as at least one other free role if the operational status of the second server indicates a failed state of the second server. Specifically, the management layer server sends out a signal as polling that the first role is free role if the operational state of the first server indicates a failed state, and any of the spare servers can take up the first role. Similarly, the management layer server sends out a signal as polling that the other role is a free role if the operational state of the other server indicates a failed state of the other server. Herein, the term "free role" refers to a task, function or program that is not currently executed by any of the servers, and thus is free to be executed by any of the servers. As aforementioned, the role management layer is configured to maintain a list of each of the roles against each of the servers and continuously update the list in real-time.

Further, the management layer server is configured to update a role of a first one of the at least one spare server to the first role when the operational status of the first server indicates a failed state and reallocating the first group of users to the first one of the at least one spare server. In such a case, a communication link between the first group of users and the first server may be suspended and a new communication link may be established between the first group of users and the first one of the at least one spare server. It will be appreciated that an operational status of the spare server is determined prior to allocation of the first group of users to the particular spare server. Notably, the first role that was initially executed by the first server, is assigned to be performed by the spare server. Optionally, when the operational status of the first server indicates a failed state, the management layer server is further configured to determine a current state of execution of the first role and update the role of the first one of the at least one spare server to the current state of execution.

Further, the management layer server is configured to update a role of another one of the at least one spare server to the at least one other role when the operational status of the at least one other server indicates a failed state and reallocating the at least one other group of users to the at least one other spare server. In such a case, a communication link between the other group of users and the other server may be suspended and a new communication link may be established between the other group of users and the another one of the at least one spare server. It will be appreciated that an operational status of the spare server is determined prior to allocation of the other group of users to the particular spare server. Notably, the other role that was initially executed by the other server, is assigned to be performed by the particular spare server. Optionally, when the operational status of the at least one other server indicates a failed state, the management layer server is further configured to determine a current state of execution of the at least one other role and update the at least one other role of the at least one other one of the at least one spare server to the current state of execution.

Indeed this setup of updating roles enables efficient usage of network resources (the spare servers). Amount of spare servers can be reduced since each of the spare server can be configured to take any role (the first free role or the other free role). There is, thus, no need to have dedicated spare servers for each of the possible roles. Advertisement of a free role can be implemented for example by sending messages to spare servers. Messaging can be done using for example multicast protocol to enable message to reach spare servers faster than polling each of the spare servers one at the time.

Throughout the present disclosure the term "current state of execution" as used herein refers to an ongoing functional state of each the first server and the at least one other server prior to a breakdown, overloading or signal interruption of the server. Notably, the user devices associated with each of the servers are configured to acquire and store a disk image over regular intervals time. Herein, the disk image may include a time stamp and an instruction code executed at the particular time stamp indicating a state of execution of the server. For example, in case of gaming applications, the disk image may correspond to a level of the game, or a time stamp where the game was interrupted including instruction set for the same. Further, the acquired disk image is shared with the management layer server, which in turn is configured to share the disk image with the spare server allocated to perform the free role.

According to an embodiment, the server system further comprises a proxy server layer, wherein the proxy server layer is configured to re-route the re-allocated first group of users to the at least one spare server and to re-route the re-allocated at least one other group of users to the at least one other spare server. Throughout the present disclosure, the term "proxy server layer" refers to an intermediary interface between the servers and the user devices associated with first group of users and the other group of users. Notably, the proxy server layer is configured to request the server for some service, such as a file, connection, web page, or other resource, available from the first server and/or the other server. It will be appreciated that the proxy server layer fulfils one or more operations, as is known in the art, including providing anonymity to users, enhancing performance using caching, improving security and the like. In addition, the server system also comprises routers, switches and switch fabrics for performing re-routing of the first group of users and the other group of users to particular spare servers.

The present disclosure also relates to the method of improving cyber security. Various embodiments and variants disclosed above apply mutatis mutandis to the method.

Optionally, the method further comprises advertising the first role as a first free role if the operational status of the first server indicates a failed state of the first server and advertising the at least one other role as at least one other free role if the operational status of the second server indicates a failed state of the second server.

Optionally, the method further comprises running, in the first server, a first executable software according to the first role and running, in the at least one other server, at least one other executable software according to the at least one other role.

Optionally, the first executable software and the at least one other executable software are the same. This is beneficial in a system where a large number of users are accessing same executable software such as a same game. The first group of users would be in such a scenario configured initially to user the first server (running the first executable software) and at least one other group of users to access the ate least one other server (running the same first executable software). I.e all of the users would be accessing actually the same software (such as the same game). In case of failure of the first server the first group of users which are using the first server might experience a service break (until a point the spare server is configured to take the role of the first server) but the at least one other group of users would not experience a service break.

Optionally, the first executable software and the at least one other executable software are the different.

Optionally, the method further comprises determining a current state of execution of the first role, when the operational status of the first server indicates a failed state, and updating the role of the first one of the at least one spare server to the current state of execution.

Optionally, the method further comprises determining a current state of execution of the at least one other role, when the operational status of the at least one other server indicates a failed state, and updating the at least one other role of the at least one other one of the at least one spare server to the current state of execution.

Optionally, the method further comprises determining a time difference between a moment time of analysis and a moment time of receiving the status information; analysing if the difference is larger than predetermined time difference; and deeming that the operational status indicates a failed state if the time difference is larger than the predetermined time difference.

Optionally, the method further comprises configuring a proxy server layer to re-route the re-allocated first group of users to the at least one spare server and to re-route the re-allocated at least one other group of users to the at least one other spare server.

Further optionally, the method further comprises setting up at least one additional spare server in case the at least one spare server is updated to the first role or to the one other role. This is beneficial as the this way number of spare servers can be kept sufficient should yet an other server to crash. Furthermore, according to additional or alternative embodiment, a role which is being advertised can be role of a spare server.

DETAILED DESCRIPTION OF THE DRAWINGS

Referring to FIG. 1, illustrated is a block diagram of an exemplary server system 100, in accordance with an embodiment of the present disclosure. As shown, the server system 100 comprises a first server 102, at least one other server 104 and at least one spare server 106. Further, the server system 100 comprises user devices 108, 110, 112 allocated to the first server 102, and user devices 114, 116, 118 allocated to the other server 104. Herein, the spare server 106 is in a stand-by mode as no user devices are allocated to the spare server 106. Further, the server system 100 comprises a management layer server 120 communicatively coupled to the first server 102, at least one other server 104 and the at least one spare server 106. Herein, the management layer server 120 is configured to determine an operational status of each of the first server 102, at least one other server 104 and the at least one spare server 106 for resource management and traffic re-routing in case of failure of the first server 102 and/or the other server 104.

FIG. 1 is merely an example, which should not unduly limit the scope of the claims herein. It is to be understood that the specific designation for the server system 100 is provided as an example and is not to be construed as limiting the system 100 to specific numbers of servers, management layer servers and user devices. A person skilled in the art will recognize many variations, alternatives, and modifications of embodiments of the present disclosure.

Figure 2A:
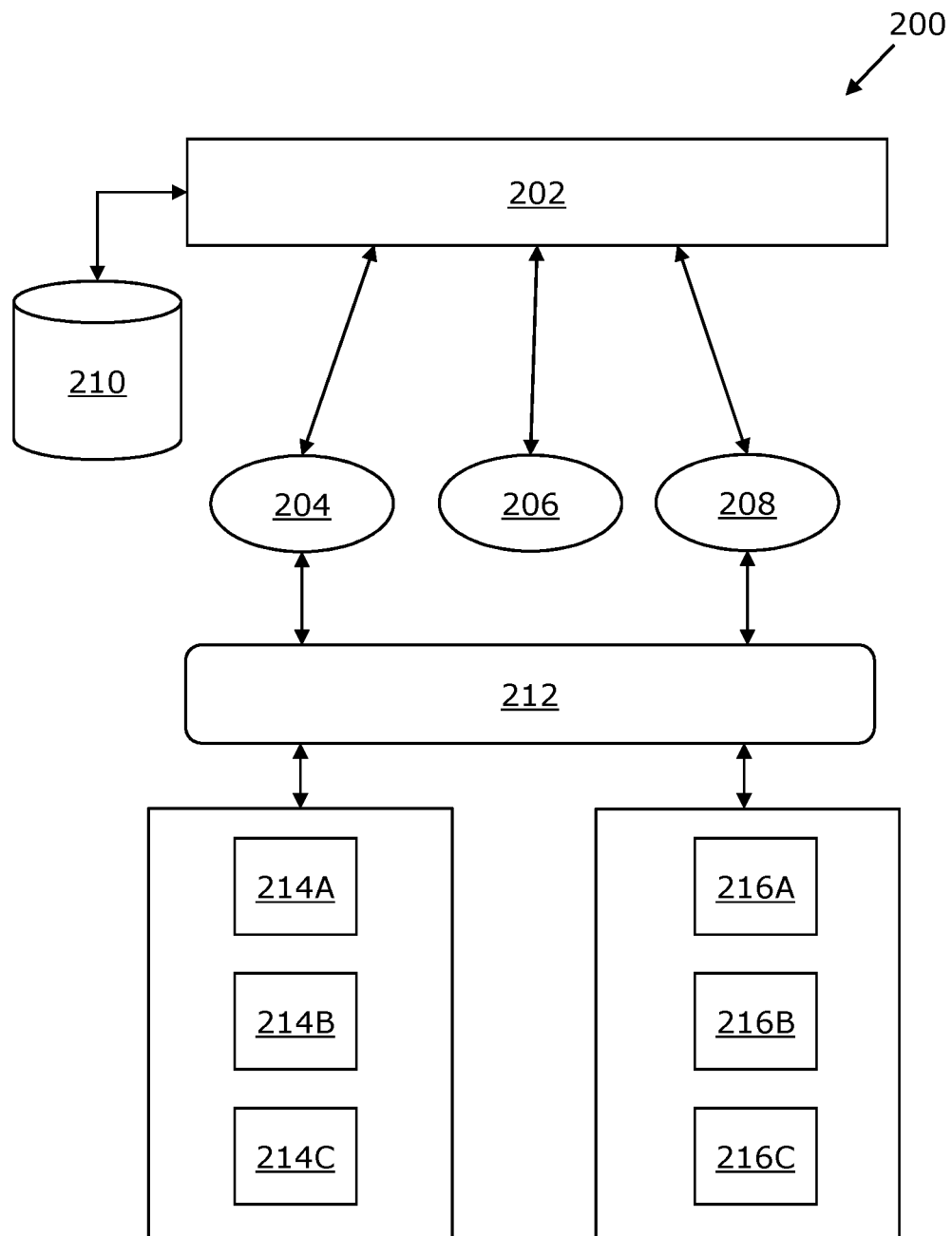
FIGS. 2A and 2B are block diagrams of an exemplary network environment, in accordance with various embodiment of the present disclosure.
Figure 2B:
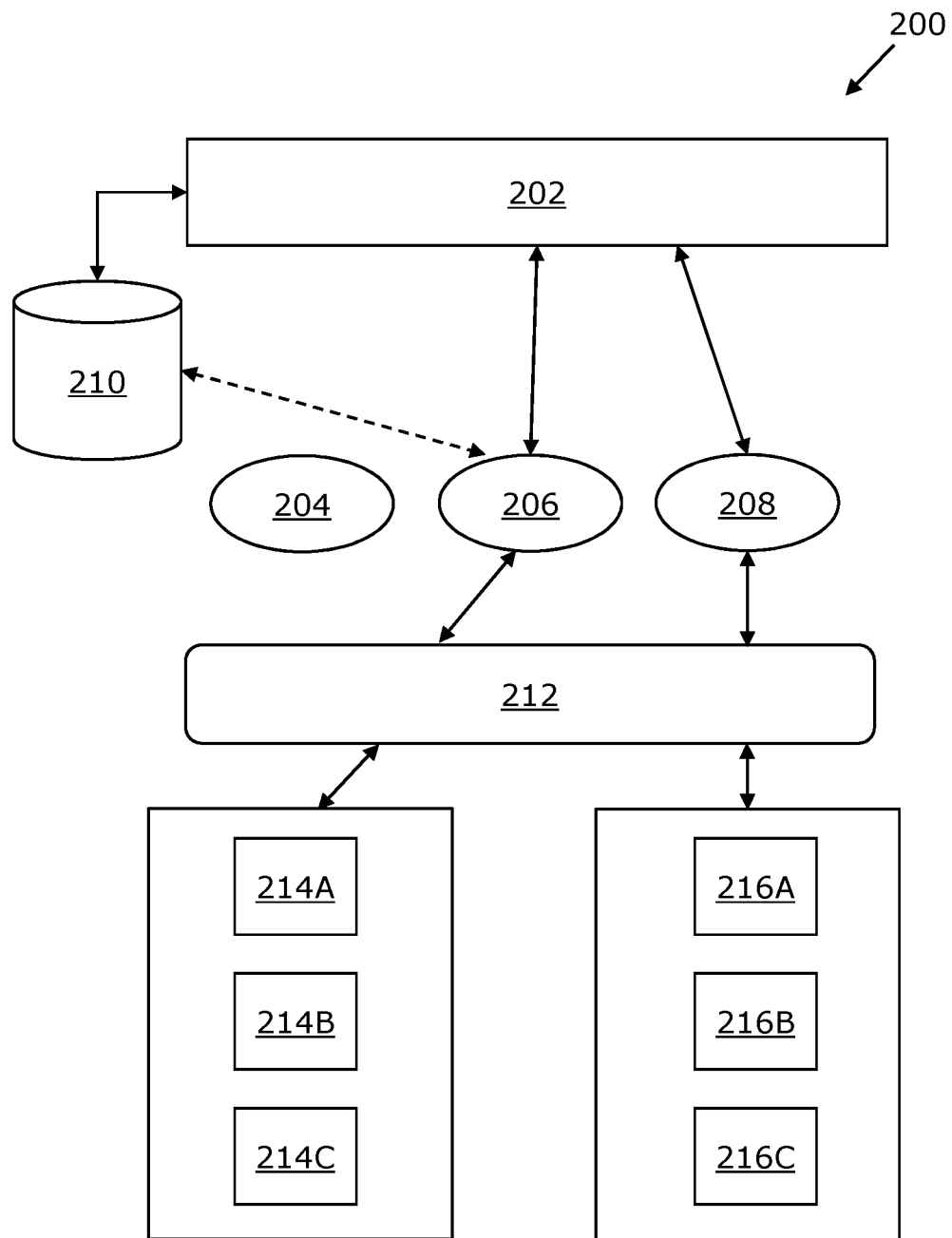

Referring to FIGS. 2A and 2B, illustrated are block diagrams of a network environment 200, in accordance with various embodiment of the present disclosure. As shown, the network environment 200 comprises management layer server 202 (such as the management layer server of FIG. 1) communicatively coupled with a first server 204 (such as the first server of FIG. 1), a first spare server 206 (such as the at least one spare server of FIG. 1), and a second server 208 (such as the at least one other server of FIG. 1). Further, the network environment 200 comprises a database arrangement 210 configured to store current execution state of each of the servers 204, 206, 208. Further, the network environment 200 comprises a proxy server layer 212.

As shown in FIG. 2A, the first group of users associated with user devices 214A, 214B, and 214C are connected with the first server 204 via the proxy server layer 212, and the second group of users associated with user devices 216A, 216B, and 216C are connected with the second server 208 via the proxy server layer 212. Herein, the first server 204 runs a first executable software according to a first role, and the second server 208 runs a second executable software according to a second role. Further, the first server 204 and the second server 208 are configured to send status information to the management layer server 202. Herein, the first server 204 and the second server 208 send the status information as "ACTIVE", and thereby connection is maintained between user devices 214A, 214B, and 214C to that with the first server 204, and the user devices 216A, 216B, and 216C to that with the second server 208.

As shown in FIG. 2B, the first server 204 and the second server 208 are configured to send status information to the management layer server 202. Herein, the first server 204 sends the status information as "FAILED", and the second server 208 sends the status information as "ACTIVE" to the management layer server 202. In this case, the management layer server 202 is configured to advertise the first role as free role and allocate the user devices 214A, 214B and 214C associated with the first group of users to the first spare server 206. Herein, the re-routing of the first groups of users is carried out by the proxy server layer 212. Further, the first spare server 206 is configured to perform the first executable software according to the first role. Specifically, a current state of execution is accessed from the database arrangement 210. Further, as mentioned, the second server 208 is allocated second group of users associated with user devices 216A, 216B, and 216C are connected with the second server 208 via the proxy server layer 212. Herein, the second server 208 runs a second executable software according to a second role. Herein, the spare server 206 sends the status information as "ACTIVE" to the management layer server 202, and thereby connection is maintained of the user devices 214A, 214B, and 214C to that with the spare server 206; and the second server 208 sends the status information as "ACTIVE" to the management layer server 202, and thereby connection is maintained of the user devices 216A, 216B, and 216C to that with the second server 208.

Figure 3:
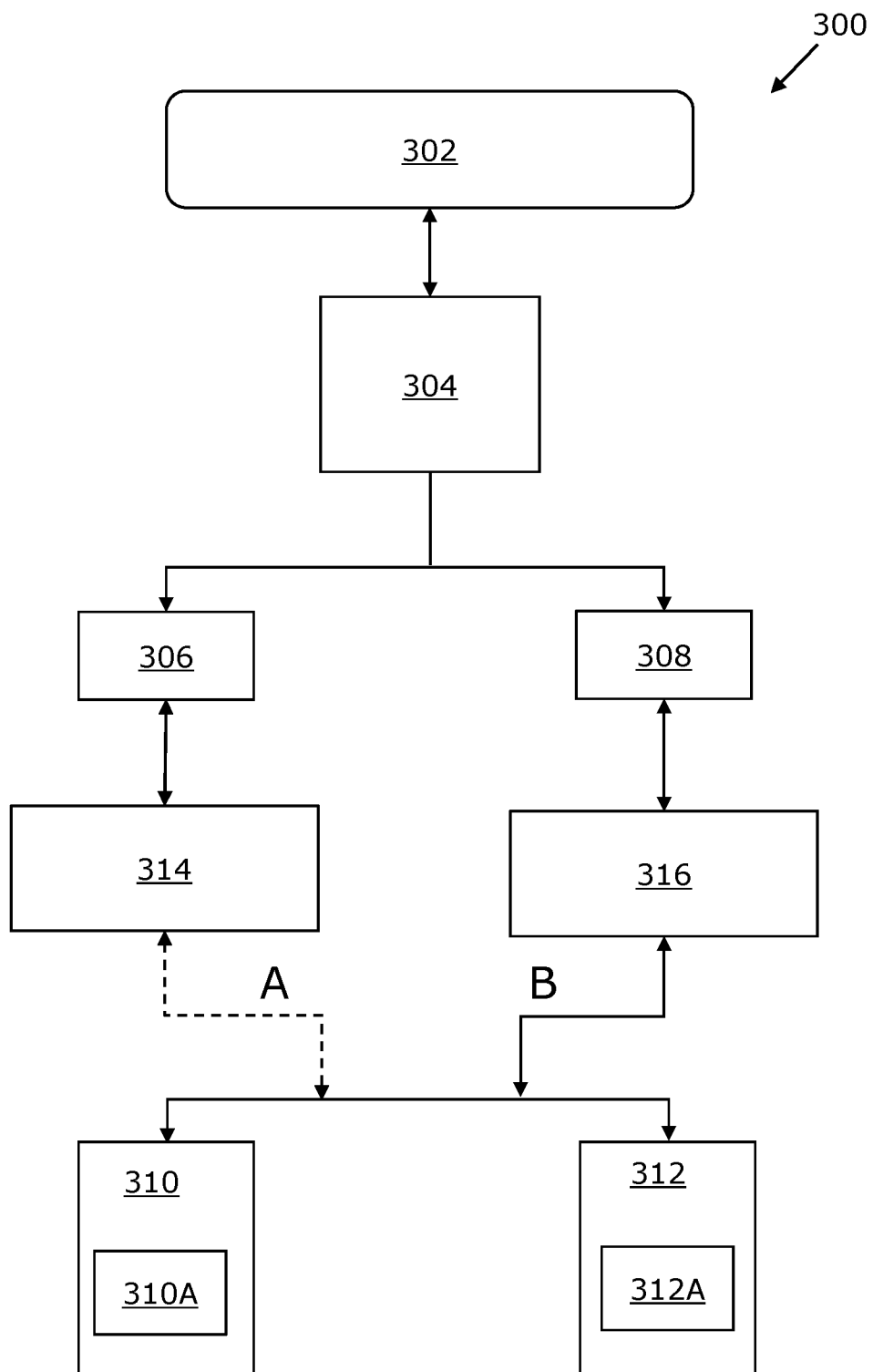
FIG. 3 is a block diagram depicting functional elements employed in the server system for re-routing users from one server to another, in accordance with an embodiment of the present disclosure.

Referring to FIG. 3, illustrated is a block diagram depicting functional elements employed in the server system 300 for re-routing users from one server to another, in accordance with an embodiment of the present disclosure. As shown, the server system 300 comprises a management layer server 302 in communication with a router 304 from re-routing traffic from one server to another. Further, the router 304 is connected to a first server 306 and a spare server 308. Further, the user devices 310 and 312 are allocated to the first server 306 via switches 314 and 316 respectively. As shown, the user device 310 comprises a memory 310A configured to store a current state of execution of the user device 306, and the user device 312 comprises a memory 312A configured to store a current state of execution of the user device 312. Further, status information of the first server 306 is transmitted to the management layer server 302. In a case, when the status information is "ACTIVE", the router 304 establishes link "A" with the first server 306 and the user devices 310 and 312. In case, the status information is "FAILED", as shown, the router 304 establishes link "B" with the spare server 308 and the user devices 310 and 312.

Figure 4:
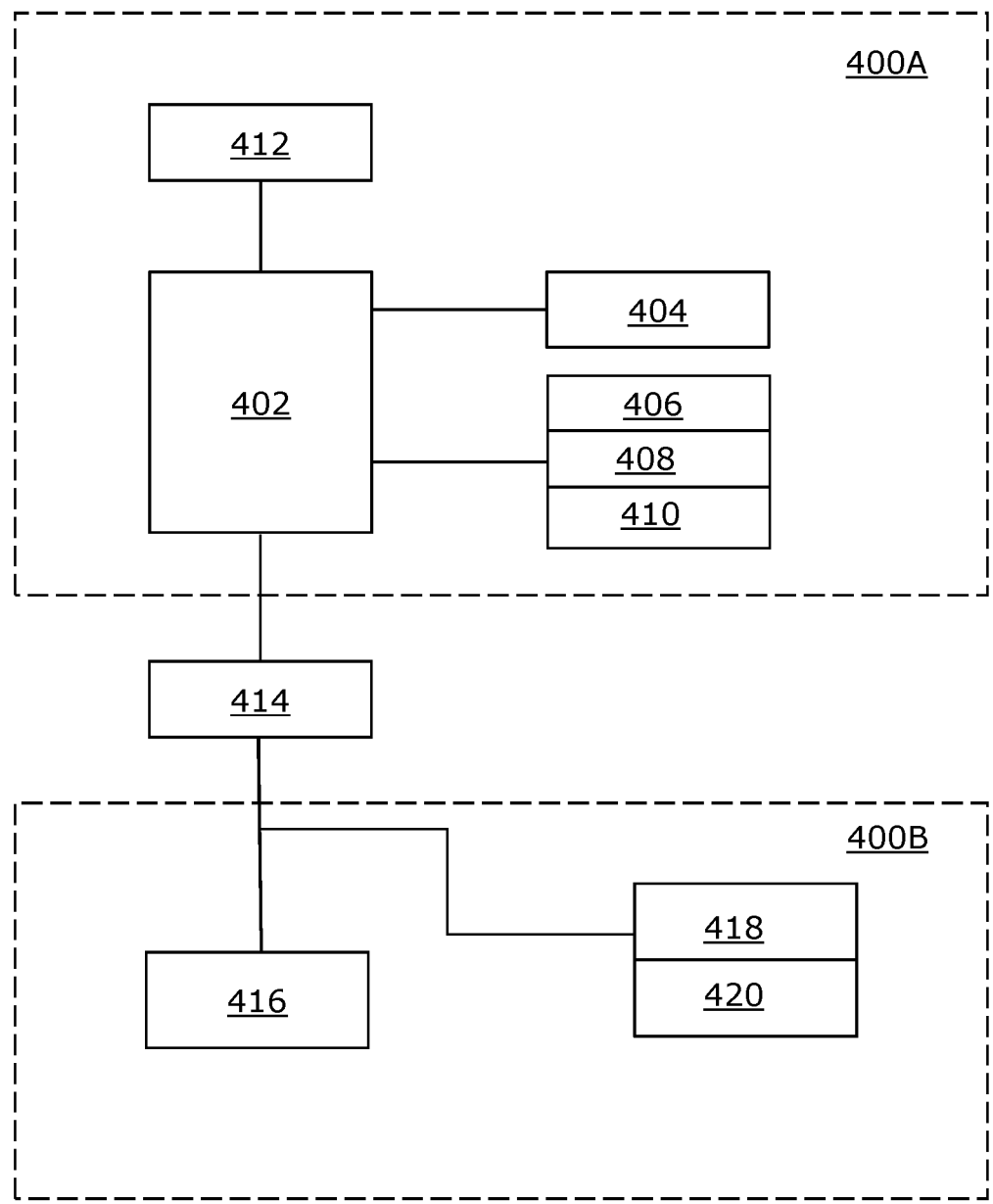
FIG. 4 is a block diagram depicting architecture of management layer server in communication with a switch, in accordance with an embodiment of the present disclosure.

Referring to FIG. 4, illustrated is a block diagram depicting architecture of a management layer server 400A in communication with a switch 400B, in accordance with an embodiment of the present disclosure. As shown, the management layer server 400A comprises a processor 402 including a Random Access Memory (RAM) 404, a flash memory 406, a BIOS 408, and an operating system (OS) 410. Further, the management layer server 400A comprises a power supply 412. Herein, the main function of the management layer server 400A is configured to improve operational efficiency of the server. The processor 402 operates at low power and a low clock rate. The processor 402 controls and processes signals from the switch 400B. Herein, in response to polling request, the processor reads the status information in the RAM 418 of the switch 400B and determined operational state of the user device. Further, the flash memory 406 is configured to store boot code from the BIOS 408 and code from the OS 410, to enable operations of the management layer server 400A. The RAM 404 is configured to store updated roles of each of the servers and maintain a structured list relating to operational states of each of the servers.

As shown, the switch 400B is in communication with the management layer server 400A via a bus 414. The switch 400B comprises a processor 416 for controlling the operation thereof and for determining a destination of each data-packet to ensure reliable transmission of data. Further, the processor 416 maintains a list of various parameters corresponding to operational status of the server. Such information is stored in RAM 418 or non-volatile memory 420 of the switch 400B.

Figure 5A:
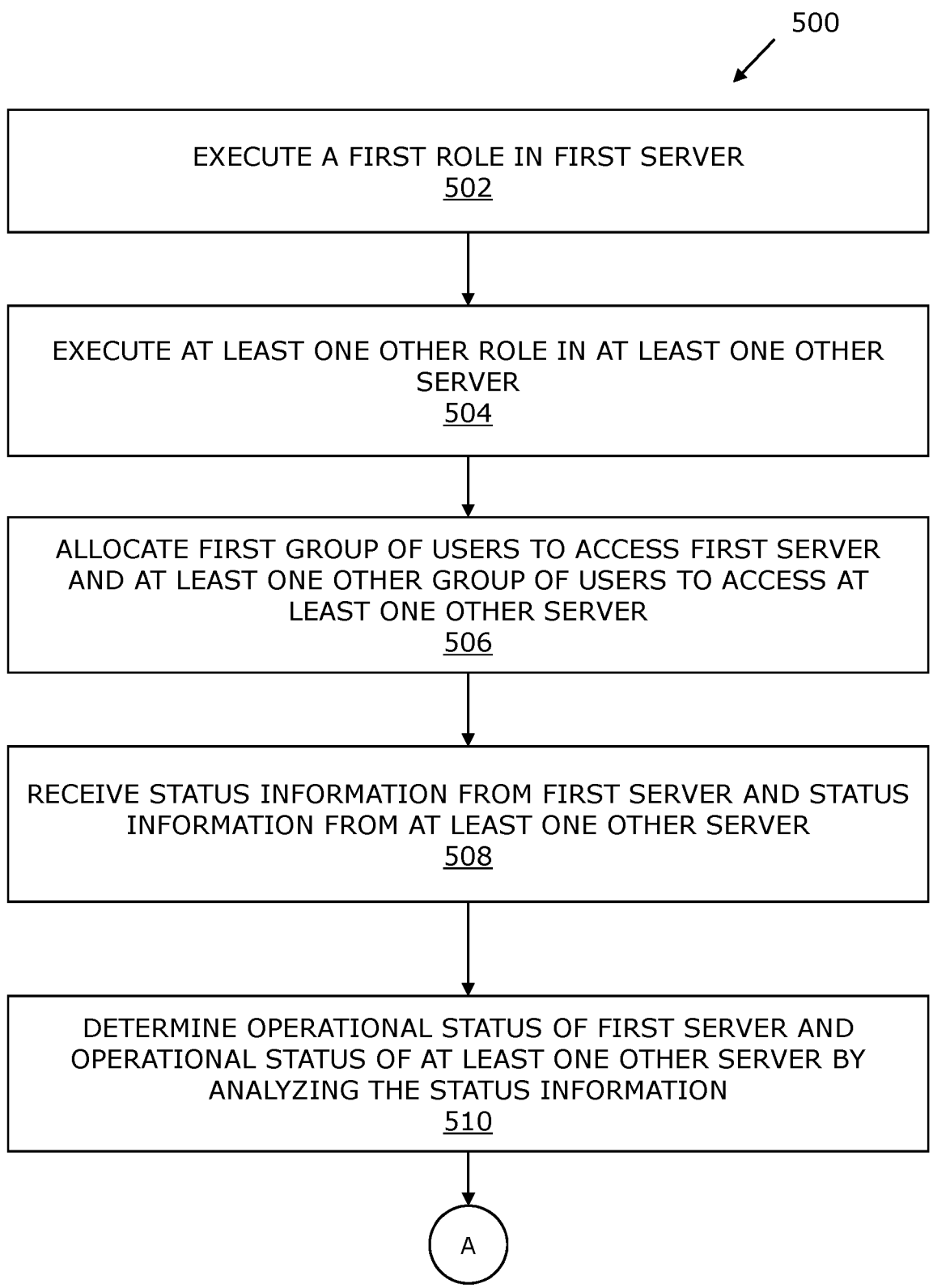
FIGS. 5A-5B provide a flowchart depicting steps of a method for managing a server system, in accordance with an embodiment of the present disclosure.
Figure 5B:
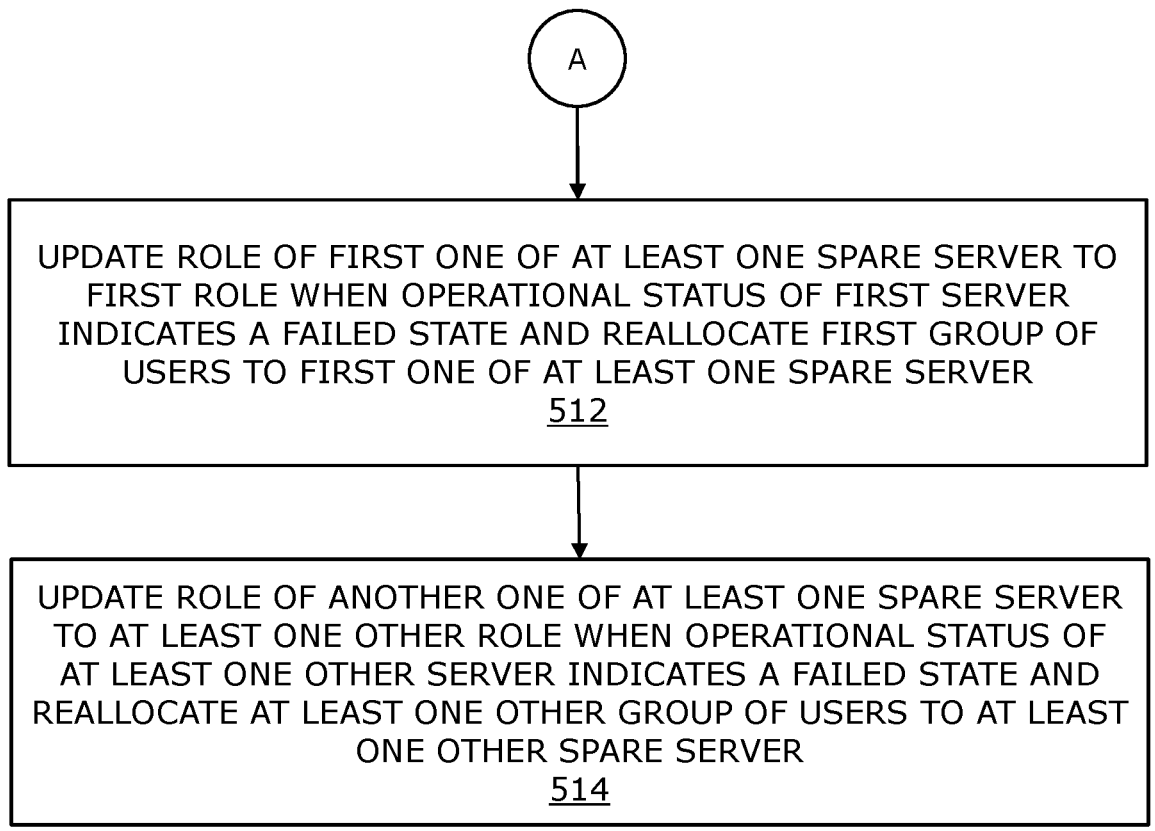

Referring to FIGS. 5A-5B, illustrated is a flowchart 500 depicting steps of a method for managing a server system, in accordance with an embodiment of the present disclosure. At step 502 a first role is executed in a first server. At step 504, at least one other role is executed in at least one other server. At step 506, a first group of users is allocated to access the first server and at least one other group of users to access the at least one other server. At step 508, status information is received from the first server and from the at least one other server. At step 510, an operational status of the first server and an operational status of the at least one other server is determined, by analysing the status information. At step 512, a role of a first one of at least one spare server is updated to the first role when the operational status of the first server indicates a failed state and the first group of users is reallocated to the first one of the at least one spare server. At step 514, a role of another one of the at least one spare server is updated to the at least one other role when the operational status of the at least one other server indicates a failed state and the at least one other group of users is reallocated to the at least one other spare server.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A server system comprising:
a first server configured to execute a first role;
at least one spare server; and
a management layer server, wherein the management layer server is configured to:
 allocate a first group of users to access the first server;
 determine an operational status of the first server; and
 when the operational status of the first server indicates a failed state, the management layer server is further configured to:
  update a role of the at least one spare server to include the first role;
   reallocate the first group of users to the at least one spare server;
  determine a current state of execution of the first role by acquiring a disk image with a time stamp and an instruction code executed at a time associated with the time stamp, the instruction code indicating the current state of execution of the first server; and
  update the role of the at least one spare server to the current state of execution of the first role by sharing the disk image with the at least one spare server, wherein the current state of execution comprises an ongoing functional state and a current instruction of the first server.

2. The server system according to claim 1, further comprising at least one other server, and wherein the management server is further configured to:
 allocate another group of users to access the at least one other server executing at least one other role;
 determine that an operational status of the at least one other server indicates a failed state;
 update a role of another one of the at least one spare server to the at least one other role, and reallocate the another group of users to the at least one other spare server.

3. The server system according to claim 2, wherein when the operational status of the at least one other server indicates the failed state, the management layer server is further configured to determine a current state of execution of the at least one other role and update the at least one other role of the at least one other one of the at least one spare server to the current state of execution.

4. The server system according to claim 1, wherein the management layer server is further configured to advertise the first role as a first free role when the operational status of the first server indicates a failed state of the first server and advertise the at least one other role as at least one other free role when the operational status of the second server indicates a failed state of the second server.

5. The server system according to claim 1, wherein the first server runs a first executable software according to the first role and the at least one other server runs at least one other executable software according to the at least one other role.

6. The server system according to claim 5, wherein the first executable software and the at least one other executable software are the same.

7. The server system according to claim 5, wherein the first executable software and the at least one other executable software are different.

8. The server system according to claim 1, wherein the operational status indicates a failed state when a time difference between a moment time of analysis and a moment time of receiving the status information is larger than a predetermined time difference.

9. The server system according to claim 1, wherein the server system further comprises a proxy server layer, wherein the proxy server layer is configured to re-route the re-allocated first group of users to the at least one spare server and to re-route the re-allocated at least one other group of users to the at least one other spare server.

10. A method for managing a server system, the method comprising:
    executing a first role in a first server;
    allocating a first group of users to access the first server;
    determining that an operational status of the first server is a failed state;
    updating a role of a first one of at least one spare server to the first role;
    reallocating the first group of users to the first one of the at least one spare server;
    determining a current state of execution of the first role by acquiring a disk image with a time stamp and an instruction code executed at a time associated with the time stamp, the instruction code indicating the current state of execution of the first server; and
    updating the role of the first one of the at least one spare server to the current state of execution of the first role by sharing the disk image with the at least one spare server, wherein the current state of execution comprises an ongoing functional state and a current instruction of the first server.

11. The method according to claim 10, further comprising:
    determining that an operational status of at least one other server executing at least one other role indicates a failed state;
    updating a role of another one of the at least one spare server to the at least one other role; and
    reallocating the at least one other group of users to the at least one other spare server.

12. The method of managing a server system according to claim 10, wherein, when the operational status of the at least one other server indicates a failed state, determining a current state of execution of the at least one other role and updating the at least one other role of the at least one other one of the at least one spare server to the current state of execution.

13. The method for managing a server system according to claim 10, wherein the method further comprises advertising the first role as a first free role when the operational status of the first server indicates a failed state of the first server and advertising the at least one other role as at least one other free role when the operational status of the second server indicates a failed state of the second server.

14. The method for managing a server system according to claim 10, further comprising running, in the first server, a first executable software according to the first role and running, in the at least one other server, at least one other executable software according to the at least one other role.

15. The method of managing a server system according to claim 14, wherein the first executable software and the at least one other executable software are the same.

16. The method of managing a server system according to claim 10, wherein the method further comprises:
    determining a time difference between a moment time of analysis and a moment time of receiving the status information;
    determining that the time difference is larger than a predetermined time difference; and
    determining that the operational status indicates a failed state when the determined time difference is larger than the predetermined time difference.

17. The method for managing a server system according to claim 10 wherein the method further comprises configuring a proxy server layer to re-route the re-allocated first group of users to the at least one spare server and to re-route the re-allocated at least one other group of users to the at least one other spare server.

18. The method of managing a server system according to claim 10, wherein the method further comprises setting up at least one additional spare server in case the at least one spare server is updated to the first role or to the one other role.

19. A method of managing a server system comprising a first server for executing a first software according to a first role and at least one spare server having another role, the method comprising:
    providing a list of roles;
    allocating a first group of users to access the executable first software running in the first server;
    advertising the first role as a free role when the first operational status of the first server indicates a failure in the first server;
    updating the another role of the at least one spare server as the advertised free role;
    determining a current state of execution of the advertised free role by acquiring a disk image with a time stamp and an instruction code executed at a time associated with the time stamp, the instruction code indicating the current state of execution of the first server;
    updating a second role to the current state of execution of the advertised free role by sharing the disk image with the at least one spare server, wherein the current state of execution comprises an ongoing functional state and a current instruction of the first server;
    executing a second software according to the updated second role in the at least one spare server; and
    re-allocating the group of users which were allocated to the failed server to access the second executable software running on the at least one spare server.

20. The method according to claim 19, wherein the server system is further configured to update the another role of the at least one spare server by suspending a communication link between the first group and the first server and establishing a new communication link between the first group and the at least one spare server.

* * * * *